June 6, 1967  F. J. RUSSELL ETAL  3,323,217

SETTING GAUGE FOR TESTING MACHINE

Filed Dec. 18, 1964  3 Sheets-Sheet 1

INVENTORS
FRED J. RUSSELL
JOHN R. ANDREW
BY Schmieding & Fultz
ATTORNEYS

June 6, 1967  F. J. RUSSELL ET AL  3,323,217

SETTING GAUGE FOR TESTING MACHINE

Filed Dec. 18, 1964  3 Sheets-Sheet 3

INVENTORS
FRED J. RUSSELL
JOHN R. ANDREW
BY
Schmieding & Fultz
ATTORNEYS

United States Patent Office 3,323,217
Patented June 6, 1967

3,323,217
SETTING GAUGE FOR TESTING MACHINE
Fred J. Russell, Gahanna, and John R. Andrew, Columbus, Ohio, assignors to Columbus Auto Parts Company, Columbus, Ohio, a corporation of Ohio
Filed Dec. 18, 1964, Ser. No. 419,406
1 Claim. (Cl. 33—147)

The present invention relates generally to measuring apparatus and particularly to an apparatus for measuring the distance between spaced components of an apparatus such as the spaced plates in a spring testing machine.

In general, the apparatus of the present invention comprises a body means which slideably mounts a horizontal member and a vertical member biased to engage each other at confronting sloped surfaces. An inside micrometer is mounted on the outer end of the horizontal member and a visual dial indicator is mounted on the top of the body means so as to engage the vertical member which transmits the measurements taken by the micrometer from the horizontal member to the indicator.

As one aspect of the present invention the apparatus for measuring the distance between spaced components utilizes two moving members and a simple arrangement of slideably engaging beveled surfaces to provide a precision instrument that is less complex and expensive than prior devices used for similar purposes.

As another aspect of the present invention, the novel apparatus combines the micrometer accuracy of a conventional inside micrometer with the simplicity of the readout dial of a visual gauge indicator whereby the instrument can be used by unskilled or non-technical personnel.

As another aspect of the apparatus of the present invention, the novel construction thereof permits manufacture and fabrication at low cost using standard procedures and techniques.

As a further aspect of the present invention, the measuring apparatus may be readily and simply adjusted to meet new conditions of standardization for the distances to be measured.

It is, therefore, an object of the present invention to provide an apparatus of the type described which is of simple and inexpensive construction as compared with prior devices used for similar purposes.

It is another object of the present invention to provide an apparatus of the type described which is highly accurate yet so simple to use that unskilled workers may operate it.

It is another object of the present invention to provide an apparatus of the type described which may be manufactured and fabricated at minimum cost using standard techniques and procedures.

It is a further object of the present invention to provide an apparatus of the type described which may be readily adjusted to meet changing working requirements with ease and quickness.

Further objects and advantages of the preesnt invention will be apparent from the following description, reference being had to the accompanying drawings wherein a preferred form of embodiment of the invention is clearly shown.

Figure 1:
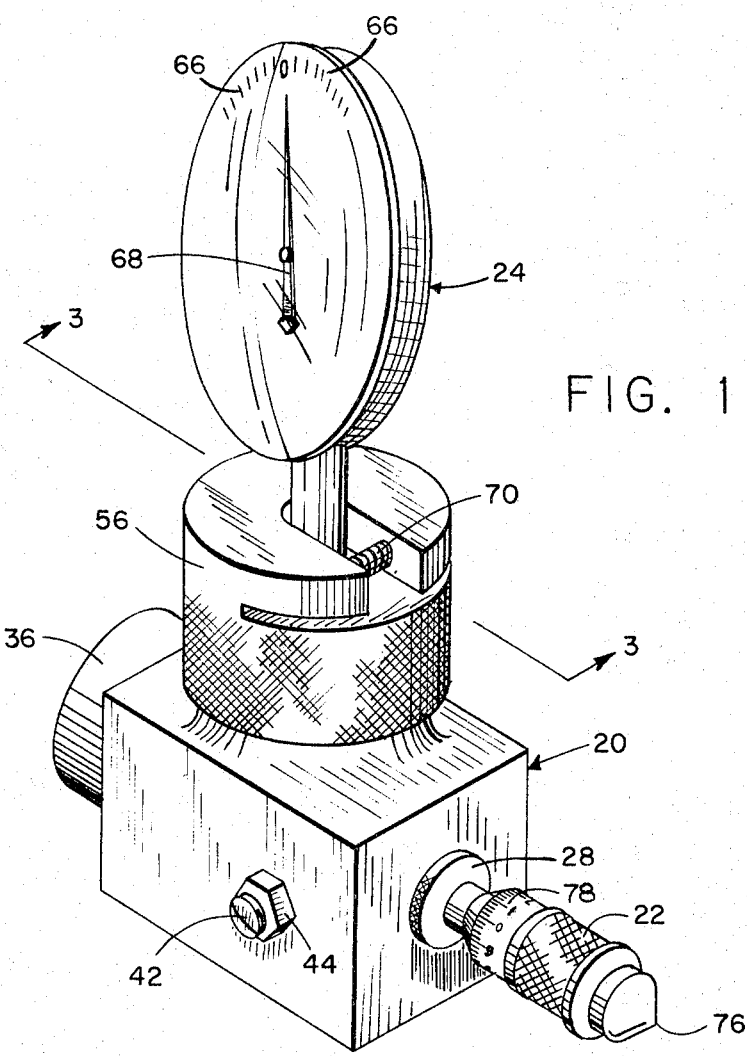
FIG. 1 is a perspective view of an apparatus for measuring the distance between spaced machine components, said apparatus being constructed in accordance with the present invention.

Referring in detail to the drawings, FIG. 1 illustrates an apparatus for measuring the distance between spaced objects that comprises in general a body means, indicated generally at 20, an adjustable measuring means in the form of an inside micrometer indicated generally at 22 and a visual dial indicator indicated generally at 24.

Figure 2:
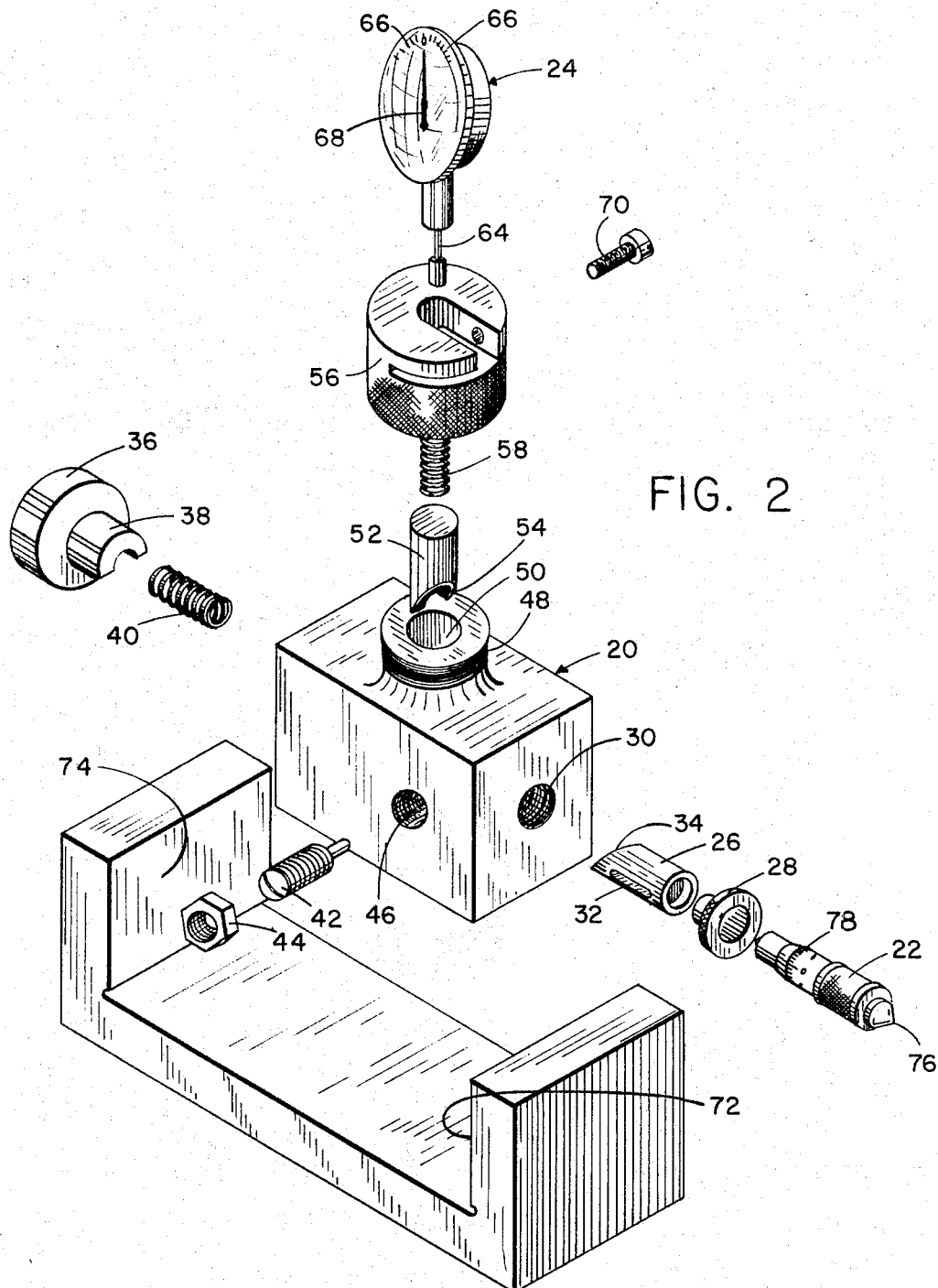
FIG. 2 is an exploded perspective view of the apparatus illustrated in FIG. 1.
Figure 3:
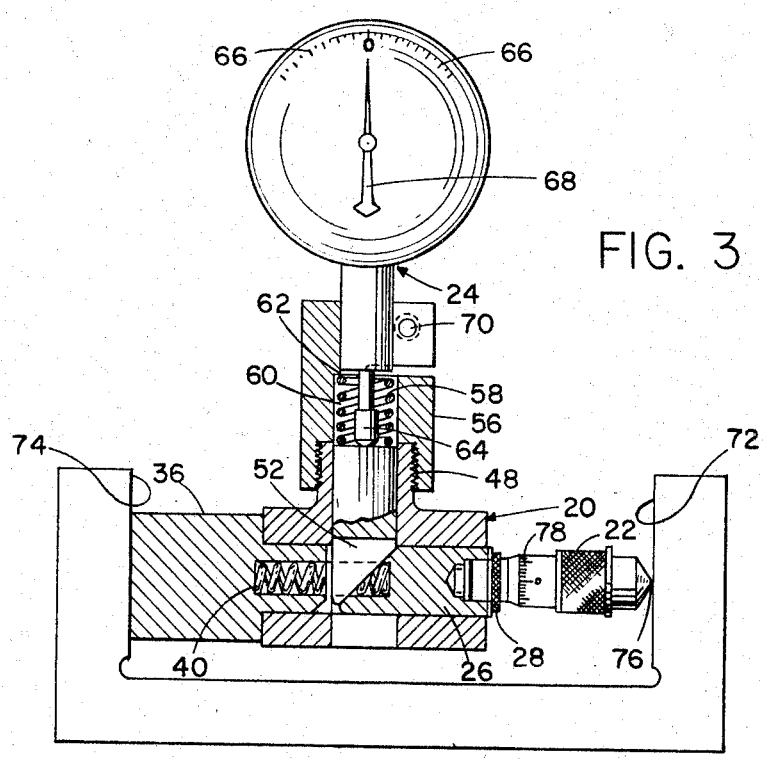
FIG. 3 is a front elevational view partially in section of the apparatus shown in FIG. 1, the section being taken along line 3—3 of FIG. 1.
Figure 4:
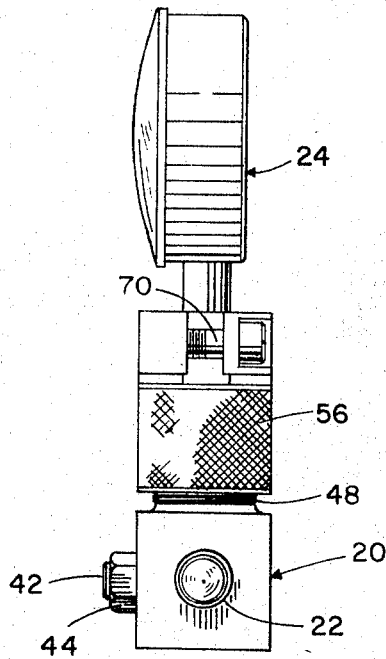
FIG. 4 is a side elevational view of the apparatus shown in FIG. 1.

Referring next to FIGS. 2 and 3, micrometer 22 is mounted in a tubular member 26 and a retaining shoulder 28. Tubular member 26 is slideably mounted in a hole 30 provided in body means 20 and includes a slot 32 and an inner end having a sloping surface 34.

A shoulder 36 including a hollow neck portion 38 is inserted into body means 20 at the opposite end from member 26. A spring means 40 is disposed inside neck portion 38 and extends into the inner end of tubular member 26 biasing member 26 outwardly. A set screw 42, retained by nut 44 is extended through hole 46 in body means 20 and engages spring means 40 through slot 32 in member 26.

Body means 20 includes a threaded neck portion 48 provided with a hole 50 through which a second tubular member 52 is slideably extended. Tubular member 52 includes an inner end having a sloping surface 54 which engages sloping surface 34 of member 26.

A cap nut 56 is fastened to threaded neck portion 48 and a spring means 58 is disposed in a hole 60 provided therein between the top of tubular member 52 and spring retaining surface 62 thereby biasing member 52 toward member 26.

Visual indicator means 24 includes an actuator stem 64 engaging the top portion of member 52 and a gauge portion including calibrations 66 and dial 68. Threaded fasteners 70 extends through cap nut 56 to retain visual indicator means 24 in place.

To calibrate the apparatus for a particular application, the micrometer calibrations 78 are set at zero and point 76 and shoulder 36 are inserted between and adjusted to touch surfaces 72 and 74 of a master setting block that are for example accurately spaced at 4.0000 inches. Then the indicator dial will register zero showing that the plates are properly spaced at the required 4.0000-inch gap.

In operation, the apparatus is placed between spaced machine components or objects, for example, spaced plates of a spring testing machine, not illustrated, with the end 76 of micrometer 22 touching the inner surface of one plate and setting shoulder 36 touching the inner surface of the other plate. The plus or minus error of the gap between the plates is transmitted to the visual indicator by the wedging action of the confronting sloping surfaces 34 and 54 of tubular members 26 and 52 respectively. The horizontal movements of member 26 lift or lower member 52 which in turn causes actuator stem 64 to move vertically. The calibrations 66 on visual indicator means 24 register plus or minus deviations from the desired spacing between the plates of the spring testing machine.

To adjust the apparatus for a different spacing requirement, the setting of calibrations 78 of micrometer 22 may be changed accordingly or a different micrometer of a known different length than the one in use can be inserted to replace it. It is important to point out that the construction of the apparatus permits even an unskilled worker to operate the instrument as the operation is not complex.

While the form of embodiment of the present invention as herein disclosed constitutes a preferred form, it is to be understood that other forms might be adopted, all coming within the scope of the claim as follows.

We claim:

An apparatus for measuring the distance between spaced plates comprising, in combination, body means; means on said body means forming a spring retaining means; a horizontal member slidably mounted in said body means including an inner end having a sloping surface and a spring retaining bore opening through said surface; a vertical member slidably mounted in said body means including an inner end having a bifurcated sloping surface confronting said sloping surface of said horizontal member; spring means in said bore and spring retaining means operative between said body and horizontal member and extending through said confronting sloping surfaces for biasing said horizontal member outwardly; resilient means operative between said vertical member and said body means for biasing said vertical member toward said horizontal member; and indicator means on said body engaging said vertical member for visually indicating the distance between the spaced plates.

References Cited
UNITED STATES PATENTS

| | | | |
|---|---|---|---|
| 1,431,613 | 10/1922 | Wittner | 33—147 |
| 2,192,900 | 3/1940 | Eisele | 33—178 |
| 2,910,781 | 11/1959 | Bishop | 33—178 |
| 2,930,134 | 3/1960 | Bishop et al. | 33—178 |
| 3,016,619 | 1/1962 | Mueller | 33—147 |

LEONARD FORMAN, *Primary Examiner.*

SAMUEL S. MATTHEWS, *Examiner.*